UNITED STATES PATENT OFFICE.

THOMAS CHRISTY, JR., AND ALEXANDER BOBROWNICKI, OF LONDON, ENGLAND.

IMPROVEMENT IN PROCESSES FOR TREATING SEWAGE AND AMMONIACAL WATERS FOR THE PRODUCTION OF FERTILIZERS, &c.

Specification forming part of Letters Patent No. 137,059, dated March 25, 1873.

*To all whom it may concern:*

Be it known that we, THOMAS CHRISTY, the younger, and ALEXANDER BOBROWNICKI, both of 155 Fenchurch street, in the city of London, England, have invented improvements in the treatment of ammoniacal and other liquor of gas-works, sewage, and other waters containing foreign matters in suspension or solution, in order to obtain useful products therefrom; and we do hereby declare that the following is a full and exact description thereof.

This invention relates to an improved process of treating liquids, such as ammoniacal water from gas-works, stagnant water, sewage water, and other waters containing foreign matters in suspension or solution; the object being to extract such matters, and obtain them in a comparatively solid or condensed form, in which they may be used or prepared for use as commercial products.

Hitherto it has been usual in treating liquids, in order to obtain the various foreign matters contained in them, to employ the process of evaporation, and use complicated and costly apparatus, at a high temperature—a process which is expensive and tedious, and in many cases is likely to change the nature of the substances. Processes of filtration and precipitation have also, as is well known, been employed; but, in regard to the object of this present invention, none of these processes possess the same advantages in point of efficiency and economy.

We treat liquid matters, according to the invention, at the ordinary temperature; and the agent which I employ to effect the required extraction or condensation of the matters desired to be obtained is silica. Any of the ordinary forms in which silica is found may be employed, such as fluoride of silicium, ($Si_2F_4$,) hydrofluosilicic acid, ($2HF,Si_2F_4$,) chloride of silicium, ($Si_6H_4Cl_{10}$,) and the alkaline soluble silicates may be used, care being taken that the silica is used in such a form as to be capable of penetrating the entire liquid mass, and of combining with the water, thereby forming a hydrate which agglomerates the substances suspended or dissolved in the liquid. The matters thus agglomerated by the agency of the silica are presented in a comparatively solid or condensed form, and may afterward be further solidified or condensed by exposing the mass to the action of the atmosphere and allowing it to part with its excess of water. It is the property of the hydrate formed as above described to lose the excess of water at the ordinary temperature, and it will then leave a crystalline deposit composed of useful matters. This deposit forms a raw product, the obtaining of which constitutes the object of the present invention. Ordinary soluble alkaline silicates may advantageously be used, such as silicate of soda or silicate of potassa.

In carrying the said invention into practical operation, we mix the silicate with the liquid to be treated in an open or closed vessel, and add a suitable acid to the mixture, if there be not an acid already present therein. The silicate is thereby formed into hydrate. The quantity of the silicate that should be used, and of the acid required to saturate it, will depend upon the nature of the silicate employed and on the density of the liquid proposed to be treated, and also on the density of the agglomerated mass which is produced, and which may be rendered more or less firm, as required.

Persons experienced in carrying on similar chemical operations will have no difficulty, after a little practice, and with the information above given, in adapting the improved process to various conditions, and obtaining such results as may be required.

For treating an ordinarily-saturated liquor, such as an ammoniacal liquid, the following are the proportions which we employ, and which may serve as a guide for other operations: Liquor, ten; silicate, one; sufficient acid, such as sulphuric acid, to saturate the liquor, in equivalent quantity.

The theory of the process is as follows: The soluble salts possess the faculty of crystallization, but are generally prevented from doing so by their particles being separated by the liquid mass, and thus escaping the attraction of the molecular force. Instead of employing heat to concentrate the liquor, as usual, we introduce silica into the liquid mass in a state of soluble combination, and by that means we get it into a nascent state, in order that the molecular action of the silica, which has now become hydrated, may bring together the particles of the salts and crystallize them. This hydrated mass, exposed to the free action of the ordinary temperature under a little pressure, loses its excess of water, and the whole becomes converted into a pulverized crystalline state, combined with other matters which existed primarily in the liquor. All the combinations of silica, in so far as they are capable of penetrating and saturating the liquid mass, may be used for this purpose. Many of these combinations are already known in the present state of science, and are among the chemical products of commerce, such as fluoride of silicium, ($Si_2F_4$;) hydrofluosilicic acid, ($2HF,Si_2F_4$;) chloride of silicium, ($Si_6H_4Cl_{10}$;) the alkaline soluble silicates above described. The fluorine and the chloride of silicium are decomposed by water, when they deposit the silica in the nascent state, occasioning the formation of hydrofluosilicic acid, ($2HF,Si_2F_4$,) and chlorohydric acid; consequently, these two combinations of silica may be advantageously employed for all liquors containing volatile substance of an alkaline nature.

Hydrofluosilicic acid is not decomposed by water, but is easily separated from the nascent silica by an alkali. In short, the soluble alkaline silicates should be dissolved by means of some acid, or by means of a mixture of several acids, according to the nature of the water acted upon. The reactive acid may be introduced into the liquor either after or before the introduction of the silicate. In many cases, according to the nature of the water acted upon, this decomposition may be even obtained by a presence of a salt which will yield its acid to the alkali of the silicate and bring the silicate into a nascent state ready to make fresh combinations with the water or with some other body present in the water.

If the liquor to be acted upon contains products which may become volatile by the action of an alkali of the silicate, the acids should be introduced into the liquor before the silicate, and in sufficient quantity not only to decompose the silicate, but also to fix the volatile product, if it is of an alkaline nature.

In practice two things may occur: there may be either an excess or an insufficiency of acid. In the first case a certain portion of the silica will be dissolved, causing the separation of the liquid portion from the gelatinous mass. This liquid part will be collected for separate treatment, generally by evaporation at a low temperature, and the residue thus obtained is valuable for agricultural purposes, by containing silica in a state of solution which allows the roots of the plants to absorb this important element in vegetable economy. In the second case, when the quantity of acid is insufficient, volatile emanations will take place. To avoid any loss of these useful products, they must be fixed, according to their nature, by the known methods. For ammoniacal emanations, for example, it will be sufficient to provide the gelatinous mass with natural phosphates or those previously treated with chlorohydric acid, sulphuric acid, or in some other manner. These emanations may also be destroyed by the presence in the liquor of any fatty substance.

When treating the fetid water of fecal matters it is very useful to disinfect them previously with heavy oils, such as coal-oils. Their presence facilitates the decomposition of the silicate and imparts an odor to the residuum which cannot but be very useful in manure by aiding the destruction of insects. The practical operation, according to this process, is the simplest. It is effected at the ordinary temperature, and is equally easily carried out, whether on the smaller or on the most extensive scale, obviating the use of any complicated and costly apparatus, and simply consists in an admixture of the liquor to be treated with a reactive silicate, an admixture which may be made in ordinary wooden vessels, closed or open, according as it is required to obtain a product of all the salts present in the liquor or to allow for the volatile products to be separated from them for separate treatment. As soon as the gelatinous or concentrated mass has become sufficiently consistent, which occurs immediately, it is placed upon surfaces prepared and sheltered from the rain in tolerably large heaps, similar to the heaps at salt-pits. This mass, in consequence of natural desiccation, is soon covered with a fine crystalline dust, which must be swept off occasionally, and forms the product containing the salts present in the water which has been treated. This treatment in no way modifies the substances, nor their property of solubility. For evidence of this it is sufficient to mix a portion of this dust with pure water, and you immediately obtain the mother liquid with its primitive color only, containing, besides, a small quantity of the natural silica which has been employed, but in such a state of division that plants absorb it easily.

The following relates only to the treatment of ammoniacal liquors of gas-works in order to obtain valuable products therefrom.

The ammoniacal liquors from gas-works are, at present, generally only worked commercially for the purpose of extracting therefrom ammonia, either volatile or in combination with other matters.

In carrying out our improvements we utilize not only the ammonia, but other of the substances contained in such ammoniacal liquor. These substances we arrange in groups corresponding with their chemical radicals—thus: 1. Azoted substances whose radical is azote combined with hydrogen, ammonium, ($AzH^3$.) 2. Azoted substances whose radical is azote combined with carbon, cyanogen, ($AzC^2$.) 3. The various substances present in ammoniacal waters, or in the product obtained in working according to the former part of this specification.

I. We extract the ammonia either during the formation of the dry or stable product described in such former part, or at the moment of treating the ammoniacal liquids, or after the treatment of such product, (in short, at any convenient time,) by means of fixed alkalies, (potash, soda, or lime,) an operation which is analogous to and for a like purpose to the treatment of the liquid ammoniacal waters.

For the purpose of utilizing the ammonia we effect the alkaline admixture in a closed vessel, avoiding the high temperature usually adopted to extract the ammonia from ammoniacal water; and we employ an air-pump to facilitate the formation of and the driving out of the ammonia.

II. We divide the working of the cyanogen substance into two distinct parts, a and b.

a. The first part consists in allowing the atmospheric air to operate on the cyanated substances found in the ammoniacal liquors for various periods.

b. The second part consists of the extraction of the prussiates or the sulphocyanates, which may be obtained in different ways, according to the kind of product of cyanogen desired to be obtained; but we will give the following as an example: The cyanogen substances present in the ammoniacal waters are recognized as sufficiently aerated when the alkaline liquor (after the extraction of the ammonia) can form blue precipitate in the iron solution, or, when the liquor is treated by an acid, gives the blue precipitate with salts of iron or with the peroxide of iron.

We treat ammoniacal waters recently obtained with the alkaline silicate of soda or of potash. We collect the ammonia as it has been stated in No. 1.

We precipitate the silica by an acid to form a gelatinous mass, such as referred to in the former part of this specification. We treat the product when it has been sufficiently exposed to the air by an alkaline solution (potash or soda) until the mass has become exhausted. We put the drainings in a solution of acidulated salts of iron. The operation is well done when all the mass is a little acid and presents a fine violet-blue color. We leave the formation precipitated to settle. We decant the liquor, leaving the solid part, which we wash in cold water in the ordinary way of purifying Prussian blue.

If the drainings contain silica before the pouring in of the salts of iron it will be purified by the addition of a small quantity of lime, which will precipitate the silica and form silicate of lime, and thus we obtain deep blue of a fine color. The ammoniacal water, which having remained a sufficient time in the cistern, is treated directly either by the alkalies or by the acids, produces a fine blue or blue character of color. These waters could have been silicated, as we have said above; in this case we separate the liquid part from the gelatinous mass; we then pour into the solution some salts of iron in order to form the blue precipitate.

The solid residue, after the separation of the liquid, is thrown in a heap and exposed to the free action of the atmosphere. It can be treated after a certain time, as before described, or it can be sold directly as a raw product.

The blue which we obtain by the precipitation can be transformed easily if wished, by the ordinary means, into prussiate of potash or ferrocyanic acids or other commercial products.

If it is required to treat the ammoniacal waters at a high temperature to drive off the ammonia quickly the cyanogenic substances pass off in a great measure with the gaseous products.

Instead of burning these fetid products, as usual, after having fixed the ammonia by an acid, they must be passed through an alkaline solution containing a salt, or better still an oxide, of iron. This solution sufficiently concentrated will soon be saturated containing the prussiates quite ready to be crystallized or precipitated in the form of Prussian blue.

III. The extraction of the various matters under the form of sub-products formed during the principal operations can be made in the ordinary manner, after having withdrawn all the azoted matters.

Having thus described our invention and means which we adopt in carrying the same into effect, we would have it understood that what we claim is—

1. We claim to treat ammoniacal and other liquids of gas-works, sewage, and other waters containing foreign matters in suspension or solution by hydrated silicate, in the manner stated, so as to obtain a raw product which we call silicoid.

2. We claim to operate on the product "silicoid" in order to separate from it cyanogen and other matters, and to treat the sub-products formed during the operations substantially as described.

3. We claim to treat the ammoniacal waters from gas-works according to their condition—that is to say, to treat them either direct or after they have been concentrated under the form of silicoid, as described, for the purpose of extracting from them for commercial purposes cyanogenized, ammoniacal, and other substances contained in them.

In testimony whereof we have signed our names to this specification in the presence of two subscribing witnesses.

THOS. CHRISTY, JR.
ALEXANDER BOBROWNICKI.

Witnesses:
RUDOLPH C. NICKOL,
   10 *Birchin Lane, London.*
RICHARD T. HARDING,
   10 *Birchin Lane, London.*